H. ROBINSON & J. SMITH.
APPARATUS FOR DRESSING MILLSTONES.
No. 109,760. Patented Nov. 29, 1870.
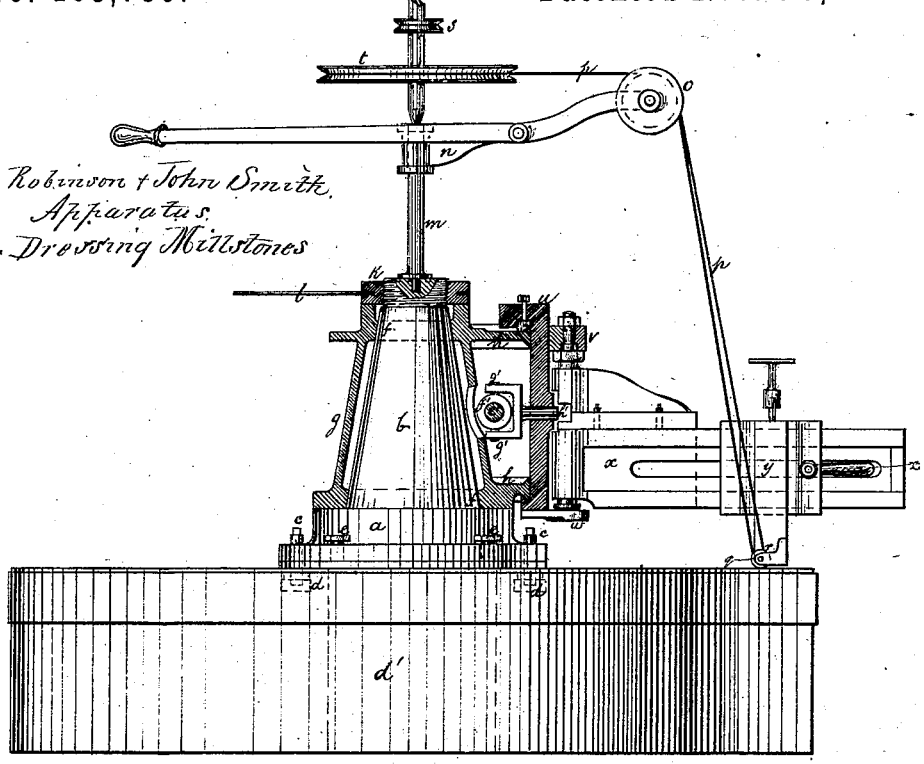
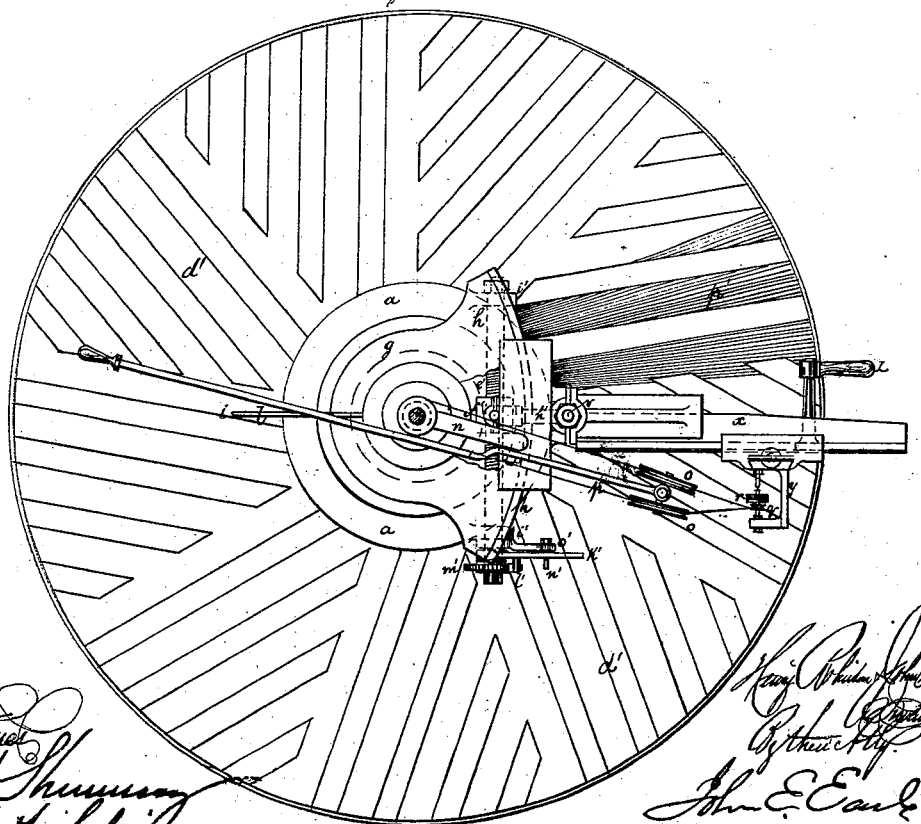

United States Patent Office.

HENRY ROBINSON, OF LEWISHAM, AND JOHN SMITH, OF CARSHALTON, ENGLAND.

Letters Patent No. 109,760, dated November 29, 1870.

IMPROVEMENT IN APPARATUS FOR DRESSING MILLSTONES.

The Schedule referred to in these Letters Patent and making part of the same.

*To all whom it may concern:*

Be it known that we, HENRY ROBINSON, of Lewisham, and JOHN SMITH, of Carshalton, both in the Kingdom of England, have invented certain new and useful "Improvements in Apparatus for Dressing Millstones;" and we do hereby declare the following to be a true and full description of the same, reference being had to the accompanying drawings. That is to say, Our improvements consist in dressing millstones so that the cracks are made coarser or wider apart at or near the skirt or periphery of the stone than near the center thereof; and In order to carry out our invention, we place in or near the eye or center of the stone a pivot, supported by a flange, which may be screwed or otherwise fastened to the said stone during the operation of dressing. Upon the said pivot a hollow casting, having a curved slide affixed thereto, is bolted or otherwise fastened, so that the said casting and its curved slide can revolve on the pivot by reason of the bolt-heads running in grooves cut in the flange above mentioned, the nuts on the said bolts being screwed tight when the casting and its slide are in a proper position for working; or the grooves may be dispensed with and a check-nut used in lieu thereof.

Across the arc of a circle formed by the above-mentioned curved slide is placed in bearings a screwed shaft, working in a nut fixed to a slide-rest, the radius of which corresponds to the radius of the curved slide, so that it may work backward and forward thereon by the rotation of the screw, and the nut is caused to slide in its socket so that it may adapt itself to the varying distance between the said screwed shaft and the periphery of the slide-rest. Or, instead of a screw, the shaft may be supplied with a worm-wheel gearing into a rack fixed to the saddle of the slide-rest, by which, or other equivalent means, the same result will be attained.

Upon the slide-rest is arranged a foot-step or bearing carrying a radial arm, on which works the tool-holder, and the center from which the radius of the arc of a circle formed by the curved slide is struck must be at a greater distance from the circumference thereof than is the center of the millstone, so that, on rotating the screwed shaft, the slide-rest will be worked along the curved slide, and the inner end of the radial arm carrying the cutting-tool will be moved a less distance than the outer end of the arm, thus causing the cracks to be coarser or wider apart at the skirt or periphery than at the center of the stone.

The cutting-tool we prefer to use is the diamond; but any other hard substance may be employed.

In order that our invention may be clearly understood, we will proceed to describe the same with reference to the accompanying drawings, in which—

Figure 1 represents a section of our improved machine; and

Figure 2, a plan of the same.

Through the flange $a$ of the cone $b$ screwed studs, $c$, pass into nuts, $d$, let into the millstone $d'$, by which said studs the machine is secured to the stone; but any other suitable means may be used for this purpose, and studs, $e$, are also used for regulating the set or tram of the machine.

Around the cone $b$, and fitting thereon at the points $f$, is the hollow casting $g$, having V or other slides, $h$, projecting therefrom, the center $i$, from which the arc of a circle formed by the said slides is struck being at a greater distance from the periphery thereof than is the center of the millstone, as seen in plan, fig. 2.

The upper part of the cone $b$ is screwed, and carries a nut $k$, which serves to tighten the casting $g$ on the said cone while a crack is being made. This can be done instantaneously by means of the bar $l$, or by any other suitable means.

Above the said cone, and resting therein, is the vertical shaft $m$, carrying the bracket $n$ for supporting the riggers $o$, around which passes the cord $p$ for actuating the pulley $q$ of the diamond cutter $r$; and above this shaft is a second shaft, having its bearing in the ceiling or roof, and carrying the grooved pulley $s$, to which motion is imparted from a water-wheel or other motive-power, and which causes the driving-pulley $t$ to rotate and give motion to the diamond cutter, as before explained.

On the V-slides $h$ is a sliding bracket or saddle, $u$, the arc of the slide whereof is struck from the same center as the arc formed by the slides $h$, and this sliding bracket or saddle carries, in bearings $v$ $w$, the radial arm $x$, with the tool-holder $y$ fixed thereto and sliding thereon, as in the ordinary construction of millstone dressing-machines. This tool-holder is moved along the arm $x$ by the handle $z$.

The radial arm $x$ is moved along the curved slides $h$ by means of the screw $e'$, working in a nut, $f'$, free to turn in its bearings $g'$ and to slide in its bearing $h'$, so as to adapt itself to the varying distance of the screw from the sliding bracket $u$, caused by the circular form of the slides $h$ and the necessary rectilinear course of the screw.

The said screw $e'$ is supported in bearings $i'$, and is rotated by the lever $k'$ actuating a pawl, $l'$, taking into a ratchet-wheel, $m'$, the extent to which the radial arm $x$ is desired to travel along the slide, and, therefore, the distance apart of the cracks is regulated by the pin $n'$ fixed in a groove in the bracket $o'$, against which pin the lever $k'$ strikes each time it is actuated.

The lever is here shown actuated by hand; but it may be worked automatically by the machine, if desired, and any other method of revolving the screw may be adopted, and, if desired, a worm, gearing into a rack fixed to the sliding bracket $u$, may be employed instead of the screw.

Instead of the radial arm a curved arm may be fixed to the said sliding bracket, by which means the dress known as the circular or sickle-dress will be formed.

The operation of the machine is as follows:

The radial arm $x$ is placed in position, either parallel with the lands of the millstone, or at an angle thereto. The lever or handle $z$ is then actuated, by which means the tool-holder, carrying the diamond cutter $r$, is moved along the radial arm $x$, thus forming a crack. The screw $e'$ is then rotated, causing the arm to be moved a short distance along the curved slides $h$. By this means each crack or line will radiate, not from the center of the millstone, but from the point $i$, from which the arc $h$ is struck, or from some point adjacent thereto, thus causing the cracks or lines to be wider apart or coarser at the periphery of the stone than near the center, as seen at $p'$, and thereby preventing the disadvantage of the stone wearing away more rapidly near the skirt than near the center thereof, by reason of the greater speed at which it travels at that part.

Having thus fully described the nature and particulars of our said invention,

We claim—

The flanged cone carrying the curved slide $h$, having the arc of a circle, of which it consists, struck from a point at a greater distance from its periphery than is the center of the millstone, in conjunction with the curved sliding bracket or saddle $u$ carrying the radial arm $x$, by which means the cracks are made coarser or wider apart near the skirt of the stone than near the center thereof, as herein specified.

In testimony whereof, we have hereunto set our hands this 30th day of December, 1869.

HENRY ROBINSON.
      JOHN SMITH.

Witnesses:
 E. J. HUGHES,
  123 *Chancery Lane, London.*
 HENRY S. ROGERS,
  123 *Chancery Lane, London.*